(12) United States Patent
Krull et al.

(10) Patent No.: US 8,534,040 B2
(45) Date of Patent: Sep. 17, 2013

(54) APPARATUS AND METHOD FOR IGNITING A COMBUSTOR

(75) Inventors: Anthony Wayne Krull, Anderson, SC (US); Geoffrey David Myers, Simpsonville, SC (US); James Harold Westmoreland, III, Greer, SC (US)

(73) Assignee: General Electric Company, Schenectady, NY (US)

( * ) Notice: Subject to any disclaimer, the term of this patent is extended or adjusted under 35 U.S.C. 154(b) by 390 days.

(21) Appl. No.: 12/944,135

(22) Filed: Nov. 11, 2010

(65) Prior Publication Data

US 2012/0117976 A1    May 17, 2012

(51) Int. Cl.
F02C 7/264 (2006.01)
F02G 1/055 (2006.01)
F02G 3/00 (2006.01)

(52) U.S. Cl.
USPC ............. 60/39.821; 60/740; 60/776; 60/747; 60/746

(58) Field of Classification Search
USPC ................... 60/737, 739–748, 39.37, 39.821, 60/39.827, 39.828, 776, 804
See application file for complete search history.

(56) References Cited

U.S. PATENT DOCUMENTS

| 2,676,460 | A | * | 4/1954 | Brown | 60/742 |
| 4,249,103 | A | | 2/1981 | Farrell | |
| 4,938,019 | A | * | 7/1990 | Angell et al. | 60/778 |
| 5,628,180 | A | * | 5/1997 | DeFreitas | 60/776 |
| 6,698,207 | B1 | * | 3/2004 | Wiebe et al. | 60/737 |
| 2010/0186368 | A1 | * | 7/2010 | Ikeda | 60/39.821 |

FOREIGN PATENT DOCUMENTS

EP    0455459 A2    11/1991

* cited by examiner

Primary Examiner — Phutthiwat Wongwian
Assistant Examiner — Craig Kim
(74) Attorney, Agent, or Firm — Dority & Manning, PA

(57) ABSTRACT

A nozzle includes a center body that defines an axial centerline. A shroud circumferentially surrounds at least a portion of the center body to define an annular passage between the center body and the shroud. A plenum is inside the center body and substantially parallel to the axial centerline, and an igniter is inside the center body and generally adjacent to the plenum. A method for igniting a combustor includes flowing a fuel through a center body axially aligned in a nozzle and flowing a working fluid through an annular passage, wherein the annular passage is substantially parallel to and radially outward of the center body. The method further includes projecting at least one of a beam, spark, or flame from an igniter located inside the center body.

16 Claims, 5 Drawing Sheets

APPARATUS AND METHOD FOR IGNITING A COMBUSTOR

FIELD OF THE INVENTION

The present invention generally involves an apparatus and method for igniting a combustor. In particular embodiments, the apparatus may comprise a nozzle or a combustor having an igniter aligned with an axial centerline of the nozzle.

BACKGROUND OF THE INVENTION

Gas turbines, aircraft engines, and numerous other combustion-based systems include one or more combustors that mix a working fluid such as air with fuel and ignite the fuel-air mixture to produce high temperature and pressure combustion gases. FIG. 1 shows a simplified cross-section of a combustor 10 that might be included, for example, in a gas turbine. A working fluid 12 may flow between a flow sleeve 14 and a liner 16 before reversing direction and flowing through one or more nozzles 18 into a combustion chamber 20. The nozzles 18 mix the fuel with the working fluid 12, and an ignition system 22 ignites the fuel-air mixture in the combustion chamber 20.

The ignition system 22 may comprise, for example, a sparkplug or laser that projects a spark or beam into the combustion chamber 20. Alternately, or in addition, the ignition system 22 may comprise a crossfire tube 24 that provides a flame, for example from an adjacent combustor, to the combustion chamber 20. In either event, the ignition system 22 is often located along a side of the combustion chamber 20 so that the ignition system 22 may project the spark, beam, or flame into the combustion chamber 20 approximately coincident with the fuel-air mixture to enhance the reliability of the ignition system 22.

The location of the ignition system 22 along the side of the combustion chamber 20 has several disadvantages. For example, the ignition systems 22 shown in FIG. 1 each require a penetration through the liner 16 of the combustor 10, creating a potential source of leakage and/or turbulent flow through or around the penetration. In addition, ignition systems 22 located along the side of the combustor 10 necessarily interfere with the flow of the working fluid 12 between the liner 16 and the flow sleeve 14, thereby increasing the differential pressure of the working fluid 12 across the combustor 10 which decreases the overall efficiency of the gas turbine. Both of these disadvantages, as well as others associated with side-mounted ignition systems 22, reduce the amount and/or flow rate of working fluid available to mix with the fuel in the nozzles 18. The amount of working fluid available for premixing with fuel has a direct impact on the peak flame temperatures and NOx emissions.

More recent attempts have been made to incorporate ignition systems into the breech end of the combustor 10 to reduce or eliminate any interference with the flow of the working fluid 12. However, the size and number of nozzles 18 located in the breech end of the combustor necessarily limits the surface area available for the ignition systems. As a result, an improved system and method for igniting a combustor 10 that reduces or eliminates penetrations through the side of the combustor 10 and/or interference with the working fluid 12 would be useful.

BRIEF DESCRIPTION OF THE INVENTION

Aspects and advantages of the invention are set forth below in the following description, or may be obvious from the description, or may be learned through practice of the invention.

One embodiment of the present invention is a nozzle that includes a center body that defines an axial centerline. A shroud circumferentially surrounds at least a portion of the center body to define an annular passage between the center body and the shroud. A plenum is inside the center body and substantially parallel to the axial centerline, and an igniter is inside the center body and generally adjacent to the plenum.

Another embodiment of the present invention is a combustor that includes an end cap and a plurality of nozzles radially disposed in the end cap. Each of the plurality of nozzles includes a center body that defines an axial centerline. A shroud circumferentially surrounds at least a portion of the center body to define an annular passage between the center body and the shroud. A plenum is inside the center body and substantially parallel to the axial centerline, and an igniter is inside the center body of at least one of the plurality of nozzles.

Embodiments of the present invention may also include a method for igniting a combustor. The method includes flowing a fuel through a center body axially aligned in a nozzle and flowing a working fluid through an annular passage, wherein the annular passage is substantially parallel to and radially outward of the center body. The method further includes projecting at least one of a beam, spark, or flame from an igniter located inside the center body.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
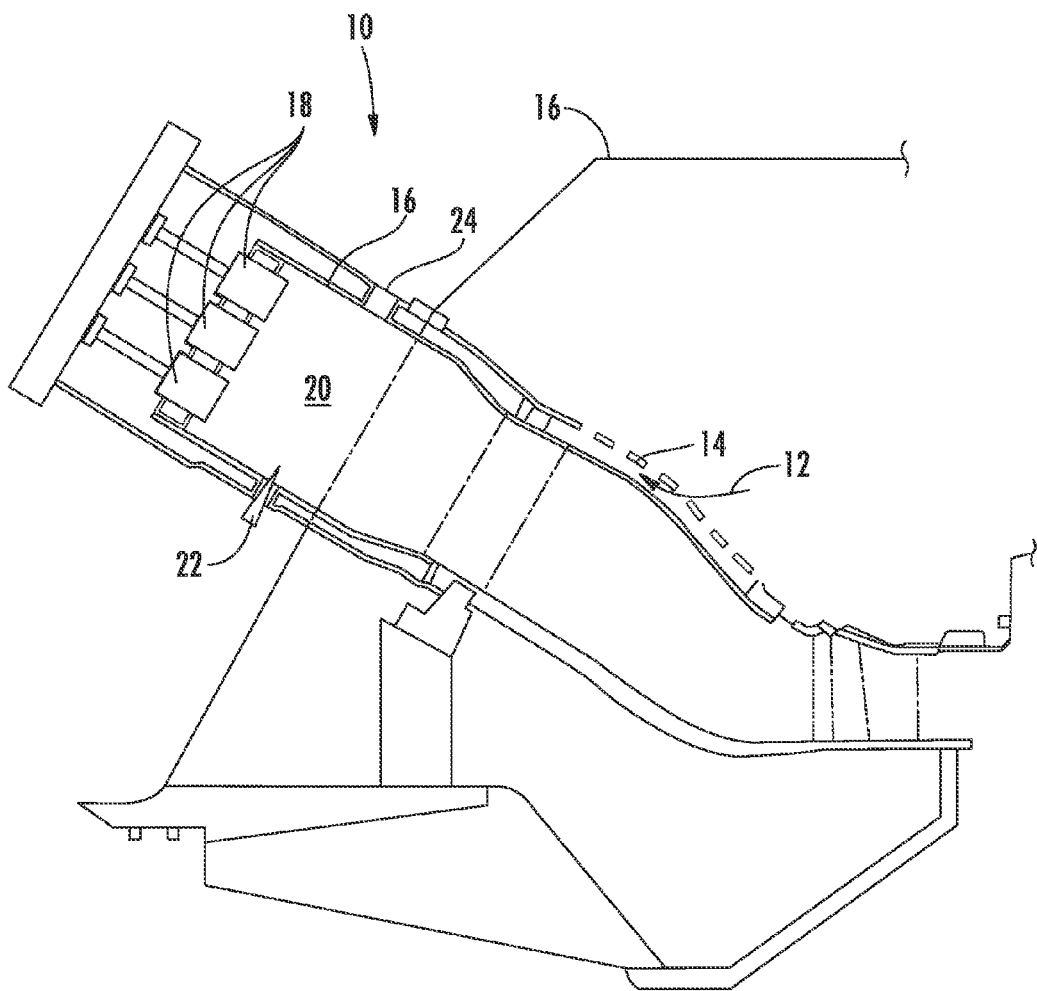
FIG. 1 is a simplified side cross-section view of an exemplary combustor.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include an apparatus for igniting a combustor that provides a reliable method for igniting the combustor. For example, some embodiments may include a nozzle having an ignition system inside the nozzle that is generally aligned with an axial centerline of the nozzle. Alternate embodiments may incorporate a plurality of nozzles into the combustor, with one or more of the nozzles having the ignition system inside the nozzle(s). In this manner, the various embodiments of the present invention provide a reliable system and method for igniting a combustor without requiring additional penetrations through the side of the combustor that may interfere with fluid flow around or through the combustor.

Figure 2:
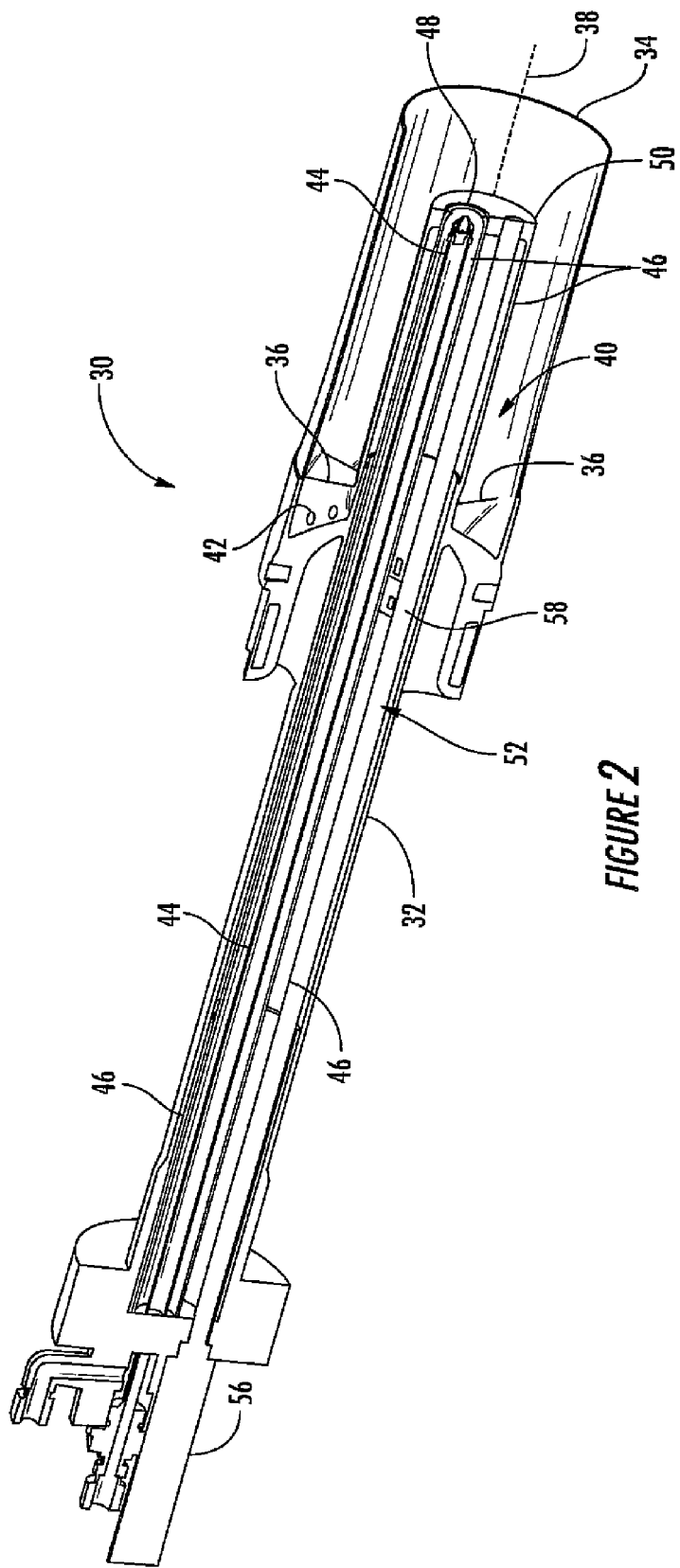
FIG. 2 is a perspective view of a nozzle according to one embodiment of the present invention.
Figure 3:
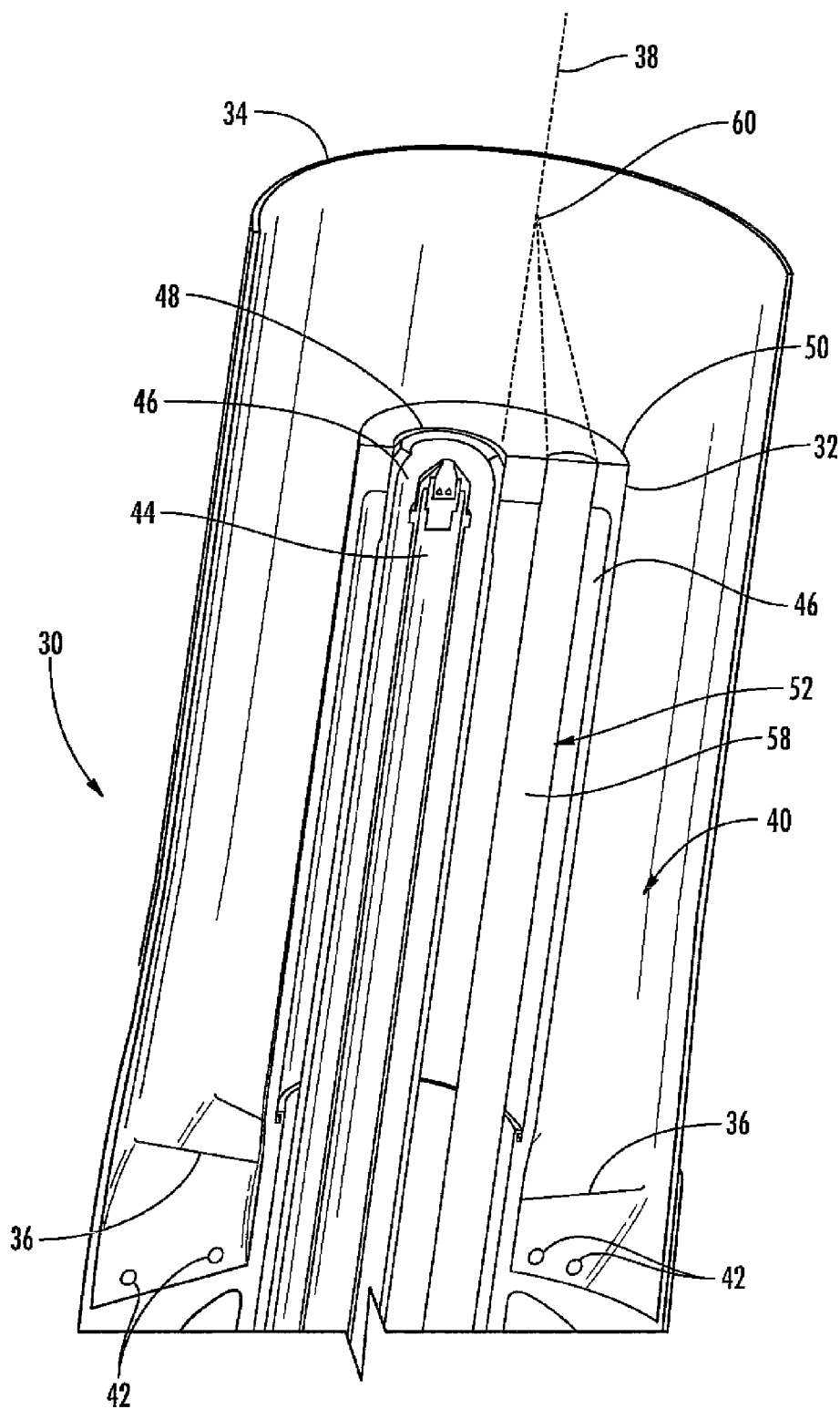
FIG. 3 is an enlarged perspective view of a portion of the nozzle shown in FIG. 2.

FIG. 2 is a perspective view of a nozzle 30 according to one embodiment of the present invention, and FIG. 3 is an enlarged perspective view of a portion of the nozzle 30 shown in FIG. 2. As shown in FIGS. 2 and 3, the nozzle 30 generally comprises a center body 32, a shroud 34, and a plurality of the vanes 36. The center body 32 is centrally located in the nozzle 30 and generally extends along the length of the nozzle 30 to define an axial centerline 38 of the nozzle 30. The shroud 34 circumferentially surrounds the majority or at least a portion of the center body 32, as shown in FIG. 2, to define an annular passage 40 between the center body 32 and the shroud 34. The annular passage 40 may be substantially parallel to the center body 32, for example as shown in FIGS. 2 and 3. The vanes 36 generally extend radially in the annular passage 40 between the center body 32 and the shroud 34, and fuel may be supplied from the center body 32 and/or the shroud 34 through fuel ports 42 in the vanes 36. In particular embodiments, the vanes 36 may be curved or angled with respect to the axial centerline 38, as shown in FIGS. 2 and 3, to impart a tangential velocity to working fluid and/or fuel flowing across the vanes 36 to enhance mixing between the working fluid and the fuel in the annular passage 40 prior to combustion.

One or more plenums may extend axially inside the center body 32 to provide fluid communication to and/or through the center body 32. For example, as shown in FIGS. 2 and 3, a fuel plenum 44 and diluent plenums 46 may extend along the length of and/or through the center body 32. The fuel may comprise a liquid or a gaseous fuel, and the diluent may comprise working fluid, water, steam, an inert gas, or another fluid suitable for diluting the fuel and/or removing heat from the center body 32. The fuel and diluent plenums 44, 46 may terminate at an opening 48 at a downstream surface 50 of the nozzle 30, thus providing fluid communication for a gaseous fuel, liquid fuel, or diluent to flow into and through the center body 32. Alternately, or in addition, the diluent plenum 46 may terminate proximate to the downstream surface 50 of the center body 32, thus providing fluid communication for the diluent to flow into the center body 32 and provide impingement cooling to the downstream surface 50 of the center body 32. The fuel and diluent plenums 44, 46 may be concentric with the axial centerline 38 of the nozzle 30, or, as shown in FIGS. 2 and 3, the fuel and diluent plenums 44, 46 may be aligned with and radially offset from the axial centerline 38.

As shown in FIGS. 2 and 3, the nozzle 30 may further include an igniter 52 inside and/or within a circumferential perimeter of the center body 32 and extending axially through the center body 32. As with the fuel and diluent plenums 44, 46, the igniter 52 may be concentric with or radially offset from the axial centerline 38. In addition, the igniter 52 may terminate proximate to the opening 48 in the downstream surface 50 of the center body 32 so that the igniter 52 is proximate to the fuel plenum 44 at the downstream surface 50 of the center body 32. The igniter 52 may comprise any suitable device known to one of ordinary skill in the art for providing an ignition source. For example, the igniter 52 may comprise a sparkplug that projects a spark substantially parallel to the axial centerline 38 of the nozzle 30. Similarly, the igniter 52 may comprise a plasma igniter, torch, or flame source supplied with a pilot fuel. When desired, the igniter 52 may be energized to ignite the pilot fuel, thereby projecting a flame substantially parallel to the axial centerline 38 of the nozzle 30. As shown in FIGS. 2 and 3, the igniter 52 may comprise a laser 56 that generates a beam through an optical tube 58 inside the center body 32. As shown in FIG. 3, the beam may have a focal point 60 downstream of the center body 32 so that the laser 56 projects the beam substantially parallel to the axial centerline 38 of the nozzle 30 to ignite fuel flowing from the fuel plenum 44 out of the center body 32.

Figure 4:
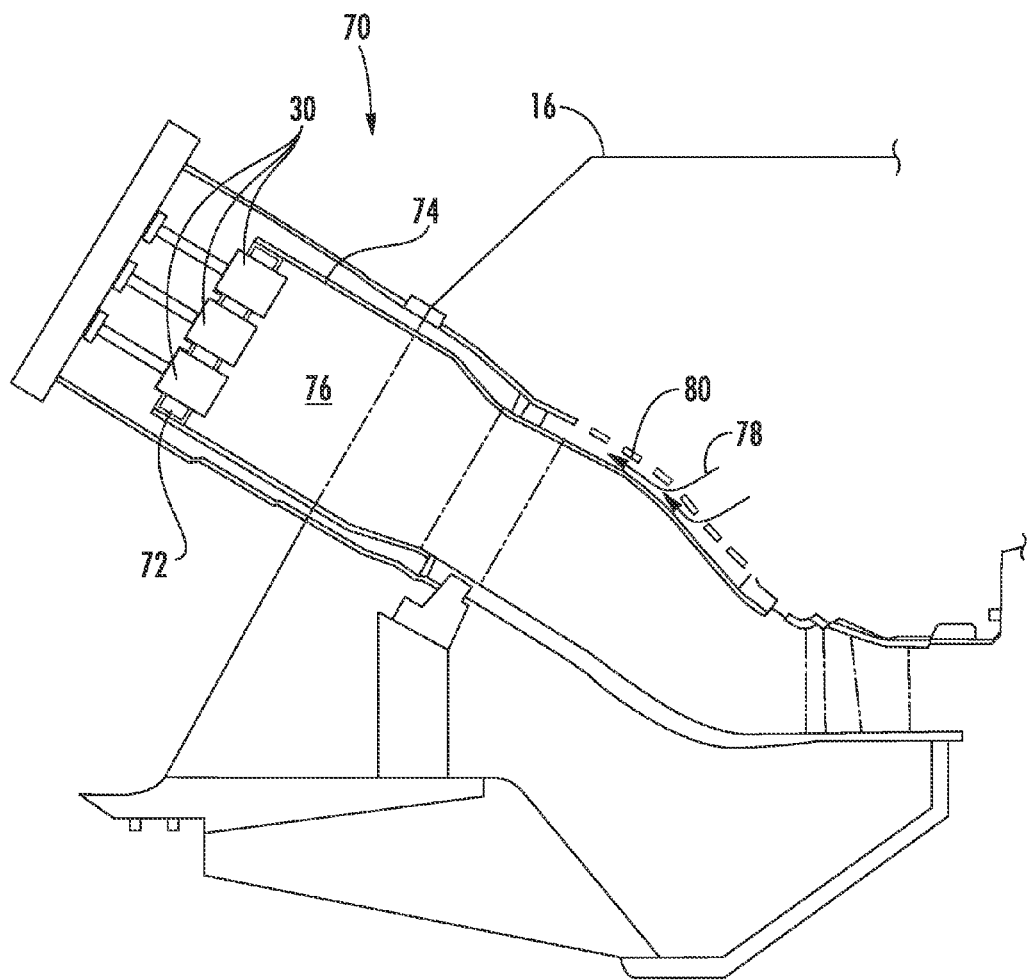
FIG. 4 is a simplified side cross-section view of a combustor according to one embodiment of the present invention.

FIG. 4 provides a simplified side cross-section view of a combustor 70 incorporating the nozzle 30 shown in FIGS. 2 and 3 according to one embodiment of the present invention. The combustor 70 generally includes an end cap 72 and a liner 74 that define a combustion chamber 76. A working fluid 78 generally flows along the outside of the combustion chamber 76 between the liner 74 and a flow sleeve 80 until it reaches the nozzles 30 where the working fluid 78 reverses direction to flow through the annular passage 40 and/or the center body 32 in the nozzles 30 and into the combustion chamber 76.

Figure 5:
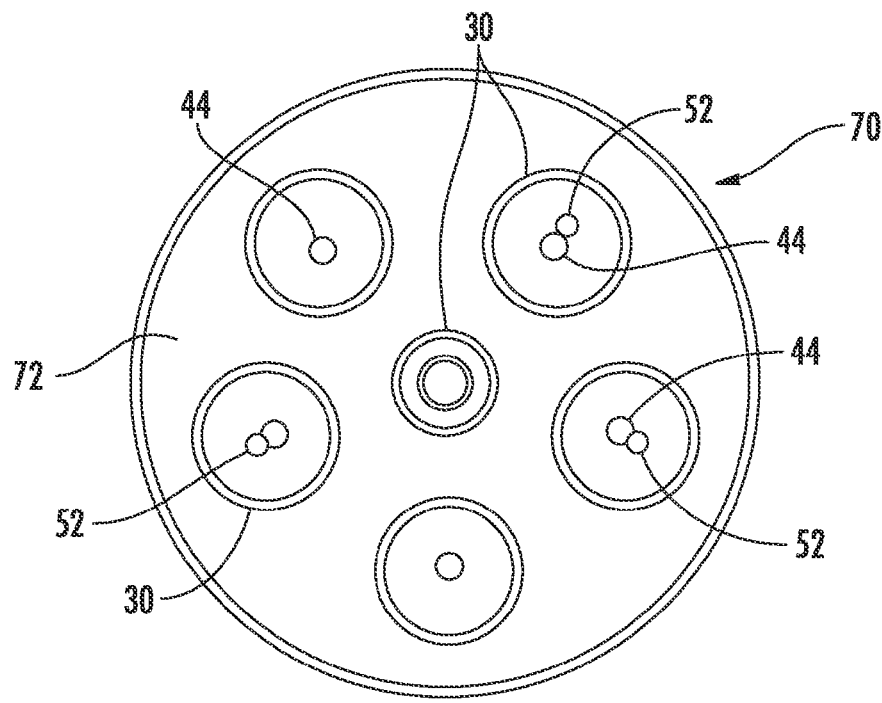
FIG. 5 is a simplified axial cross-section view of the combustor shown in FIG. 4 according to one embodiment of the present invention.
Figure 6:
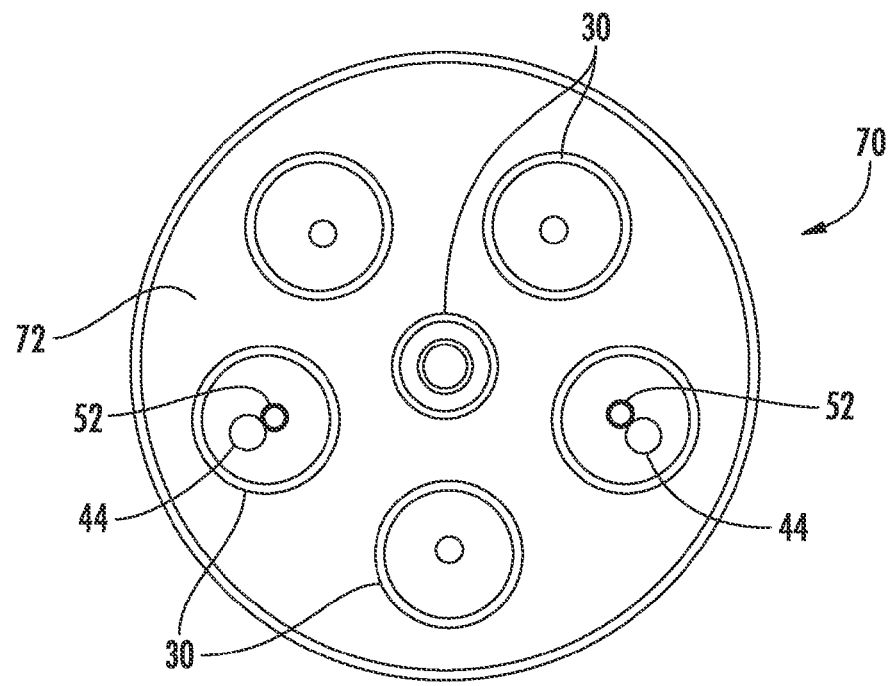
FIG. 6 is a simplified axial cross-section view of the combustor shown in FIG. 4 according to an alternate embodiment of the present invention.

FIGS. 5 and 6 provide an axial view of the combustor 70 according to various embodiments of the present invention. As shown, the nozzles 30 may be radially arranged or disposed in the end cap 72 in various geometries, shapes, and sizes. For example, multiple nozzles 30 may surround a single nozzle 30, and the nozzles 30 may have various diameters depending on the particular embodiment. FIGS. 5 and 6 further illustrate that the number and relative location of the igniters 52 with respect to the fuel plenum 44 may vary according to particular embodiments. For example, as shown in FIGS. 5 and 6, the combustor 70 may include igniters 52 in two or more of the nozzles 30 to provide a redundant or backup ignition source in the event one of the igniters 52 becomes inoperable. In addition, the nozzles 30 may be grouped in different subsets to accommodate various operating regimes, and the igniters 52 may be included in nozzles 30 of different subsets so that each subset of nozzles 30 may have a dedicated igniter 52. In addition, each igniter 52 may be located radially outward of the fuel plenum 44, as shown in FIG. 5, or radially inward of the fuel plenum 44, as shown in FIG. 6. In still further embodiments, one or more igniters 52 may be disposed in the end cap 72 outside of the nozzles 30. The particular radial location of the igniters 52 with respect to the fuel plenum 44 will depend on various design considerations, such as, for example, the type of fuel, combustion efficiency, proximity of the nozzles 30 or fuel plenum 44 to the liner 74, and other operational experience. One of ordinary skill in the art will readily appreciate that the embodiments shown in FIGS. 2-6 thus provide a reliable apparatus for igniting the combustor 70 without requiring penetrations through the liner 74 and/or flow sleeve 80. As a result, common disadvantages associated with liner 74 and/or flow sleeve 80 penetrations, such as leakage, wear, increased maintenance, and flow resistance, are reduced or avoided completely.

The embodiments shown and described with respect to FIGS. 2-6 may further provide a method for igniting the combustor 70. The method may include flowing liquid or gaseous fuel through the center body 32 axially aligned in the nozzle 30 and flowing working fluid 78 through the annular passage 40. The method may further include projecting at least one of the beam, spark, or flame from the igniter 52 located in the center body 32. In particular embodiments, the beam, spark, or flame may be projected substantially parallel to the axial centerline 38 of the nozzle 30 and/or radially outward of the fuel flowing through the center body 32.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A fuel nozzle comprising:
 a. a center body, wherein the center body defines an axial centerline;
 b. a shroud circumferentially surrounding at least a portion of the center body to define an annular passage between the center body and the shroud;
 c. a plenum inside the center body and substantially parallel to the axial centerline; and
 d. an igniter inside the center body and generally adjacent to the plenum, wherein the igniter is disposed radially outward of the plenum.

2. The fuel nozzle as in claim 1, wherein the annular passage is substantially parallel to the center body.

3. The fuel nozzle as in claim 1, wherein the plenum provides fluid communication for a liquid fuel through the center body.

4. The fuel nozzle as in claim 1, wherein the plenum provides fluid communication for a diluent through the center body.

5. The fuel nozzle as in claim 1, wherein the igniter comprises at least one of a sparkplug, a laser, or a flame source.

6. The fuel nozzle as in claim 1, wherein the igniter projects at least one of a beam, spark, or flame substantially parallel to the axial centerline.

7. The fuel nozzle as in claim 1, further comprising a plurality of vanes in the annular passage between the shroud and the center body.

8. A combustor comprising:
 a. an end cap;
 b. a plurality of nozzles radially disposed in the end cap, wherein each of the plurality of nozzles comprises:
  i. a center body, wherein the center body defines an axial centerline;
  ii. a shroud circumferentially surrounding at least a portion of the center body to define an annular passage between the center body and the shroud;
  iii. a plurality of vanes in the annular passage between the shroud and the center body;
  iv. a plenum inside the center body and substantially parallel to the axial centerline; and
 c. an igniter inside the center body of at least one of the plurality of nozzles, wherein the igniter is disposed radially outward of the plenum.

9. The combustor as in claim 8, wherein the annular passage is substantially parallel to the center body.

10. The combustor as in claim 8, wherein the plenum provides fluid communication for a liquid fuel through the center body.

11. The combustor as in claim 8, wherein the plenum provides fluid communication for a diluent through the center body.

12. The combustor as in claim 8, wherein the igniter comprises at least one of a sparkplug, a laser, or a flame source.

13. The combustor as in claim 8, wherein the igniter projects at least one of a beam, spark, or flame substantially parallel to the axial centerline.

14. A method for igniting a combustor comprising:
 a. flowing a fuel through a center body axially aligned in a nozzle;
 b. flowing a working fluid through an annular passage, wherein the annular passage is substantially parallel to and radially outward of the center body; and
 c. projecting at least one of a beam, spark, or flame from an igniter located inside the center body and radially outward of the fuel flowing through the center body.

15. The method as in claim 14, further comprising flowing a liquid fuel through the center body.

16. The method as in claim 14, further comprising projecting at least one of the beam, spark, or flame substantially parallel to an axial centerline of the nozzle.

* * * * *